S. A. Cox,
Making Railway Chairs,
No. 1,327. Reissued Aug. 12, 1862.
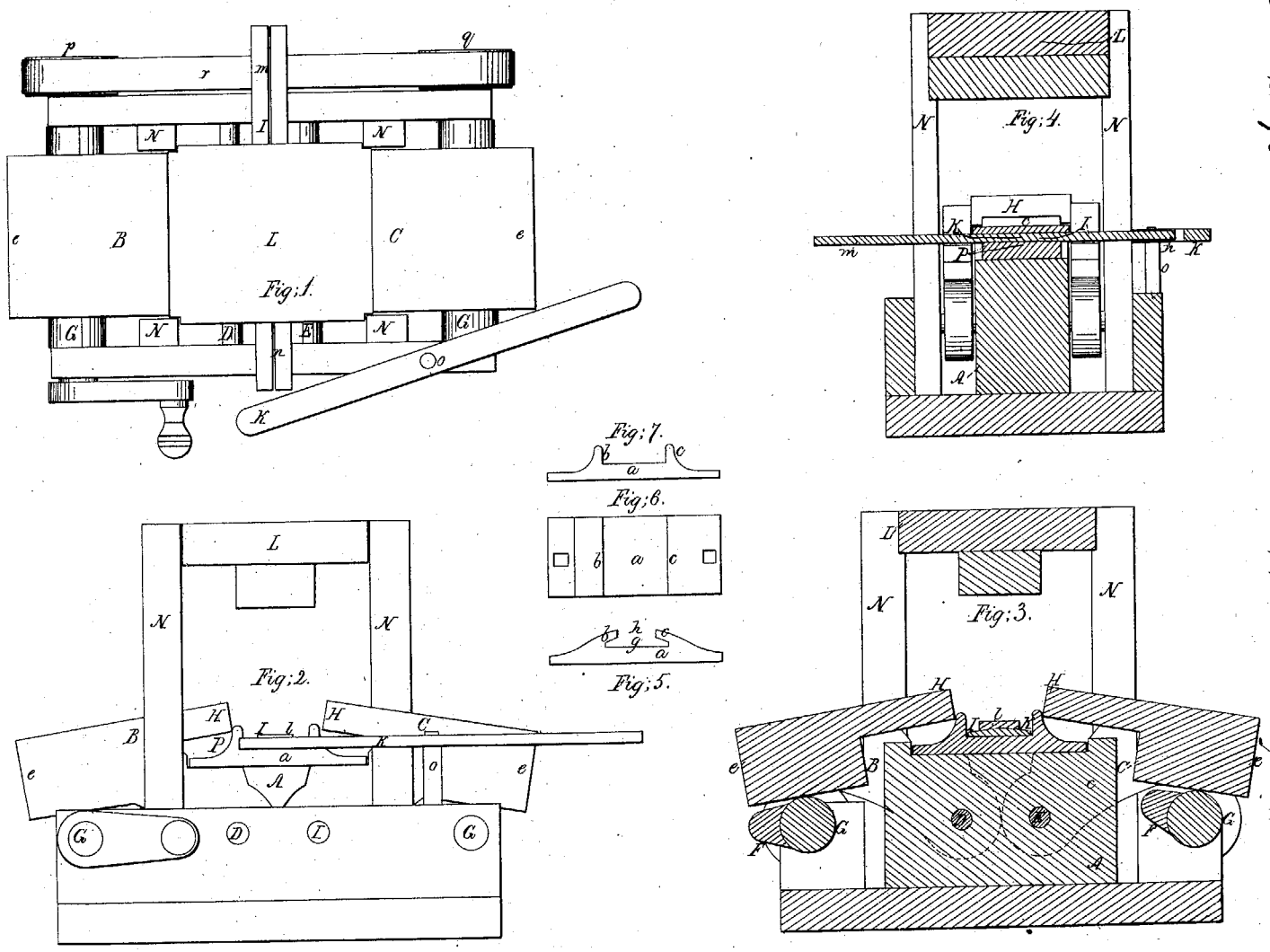
N. PETERS, PHOTO-LITHOGRAPHER, WASHINGTON, D. C.

UNITED STATES PATENT OFFICE.

GEORGE P. COX, OF MALDEN, MASSACHUSETTS, (ADMINISTRATOR OF SAMUEL A. COX, DECEASED,) ASSIGNEE, BY MESNE ASSIGNMENTS, OF SAMUEL A. COX, DECEASED.

IMPROVEMENT IN MACHINES FOR BENDING THE LIPS OF WROUGHT-IRON RAILROAD-CHAIRS.

Specification forming part of Letters Patent No. 6,683, dated August 28, 1849; Reissue No. 479, dated July 14, 1857; Reissue No. 1,327, dated August 12, 1862.

*To all whom it may concern:*

Be it known that SAMUEL A. COX, deceased, late of Malden, Middlesex county, State of Massachusetts, did in his lifetime invent certain new and useful Improvements in Machinery for Bending the Lips of Wrought-Iron Railway-Chairs, which your petitioner, GEORGE P. COX, administrator of the said SAMUEL A. COX, deceased, assignee of all the right, title, and interest in and to the said invention by certain deeds of assignment duly recorded in the Patent Office, hereby declares to be a full and clear description of the same, reference being had to the accompanying drawings, forming a part of the said specification, in which are exhibited various views of the said improved machinery used in manufacturing railway chairs from malleable metal or wrought iron.

Figure 1 denotes a top view of the said machine. Fig. 2 is a front elevation of it. Fig. 3 is a central vertical and longitudinal section of it. Fig. 4 is a central vertical and transverse section of it. Fig. 5 is a side view of a wrought-iron chair as made by the machine. Fig. 6 is a top view of the chair. Fig. 7 is a side view of it as it appears before being subjected to the action of the machine.

The object of the invention is to make railway-chairs by machinery from suitable blanks or plates of wrought or malleable iron. To do this suitable bars or plates of metal are formed into the required shape, as shown in Fig. 7, by means of a rolling-mill or a die and press to strike up the two longitudinal lips *b* and *c* on the upper surface of the plate *a*.

The nature of the invention consists, first, in the method of bending the lips of the blank down upon the former, representing the base or T, (part of the iron rail,) so as to clasp and hold it firmly down on the railway-ties by means of two converging levers arranged on opposite sides of the machine and operated by cams or other equivalent devices to cause them to converge upon the lips of the blank to bend them down; second, in the method of compressing or flattening down the edges of the lips upon the former by means of a drop-hammer or other equivalent device for that purpose; third, in the method of discharging the newly-formed chair from off the former by means of a lever or equivalent device, retiring the former from the machine to drop the newly-formed chair and make room for the adjustment of the new blank on the bed or anvil preparatory to the return of the former and action of the benders.

In Figs. 2, 3, and 4, A represents a metallic bed-block or anvil for receiving and supporting the chair-blank while the lips are being bent. Letters B and C are two arms or levers, each being supported on a fulcrum-shaft or journals, as seen at D and E. The rail *e* of each of the said levers or arms rests on and over a cam, F, which is fixed to a horizontal shaft, G, arranged as seen at Fig. 3. Above the fulcrum of each lever and situated with respect to the bed or base block A, as seen in Figs. 2 and 3, is a projection, H, which, when the levers C and B are raised up, brings the projections H H into contact with the lips *b* and *c* and bend them down upon the former I. The said former consists of a bar of metal made to correspond in its transverse section to that of the base and neck of the rail to be supported in the chair, as shown at *g* and *h* in Fig. 5.

The former may be said to be composed of two parts or formations—that is, a base, K, and the neck *l*, the said neck formation being elevated or formed upon the upper side of the base, and thus represents the base or T part of the rail. From one end of the said former a handle, *m*, extends, while on its opposite end there is a projection, *n*, for a chair-discharging lever K to act against to push back the former to free the chair from it, and at the same time to make room for the adjustment of the new blank upon the bed A before the return of the former upon the blank.

Letter L is a drop-hammer, arranged so as to play up and down in guide-ways N N, elevated upon the frame of the machine. This drop hammer may be elevated by any suitable means and suffered to drop down upon the lips so as to insure their being bent down into close contact with the former. Its use, however, is not an indispensable requisite, as the bending-levers, if properly adjusted, are sufficient in themselves to bend the lips down upon the former; but as an auxiliary device for insuring their being bent down the drop-hammer is employed for that purpose.

Letters P and *q* are two pulleys on the ends of the cam-shafts G, and *r* is an endless belt or band connecting them together for the purpose of giving to them a simultaneous movement to elevate both benders at one and the same time. It will be obvious that any suitable gearing-wheels may be substituted for the pulleys and endless band.

In using the said machine a chair-blank is placed upon the bed A, as seen in Figs. 2, 3, and 4. The former I is then placed on the blank, between its lips. When thus adjusted, motion is given to the cams, so as to elevate the tails of the bending-levers, and thereby cause the projections H H to converge upon and press or bend the lips of the chair down upon the former, so as to make their inner surfaces conform to the shape of the former. Next the drop-hammer, if used, is to be suffered or caused to fall down upon the lips with sufficient force to cause their being bent into close contact with the former. The former then is removed from off the chair by means of the lever K forcing it back so as to allow the chair to be discharged or removed from it, and at the same time make room for the adjustment of the new blank upon the bed A.

Wrought-iron chairs made by hand, or partially by rolling and partially by hand, were known prior to the date of the aforesaid SAMUEL A. COX'S invention, which, therefore, is only a combination of mechanical devices for effecting a known result more cheaply and perfectly and in a shorter time than before known.

What is therefore claimed as the invention of the said SAMUEL A. COX, deceased, is—

1. A suitable support for a chair-blank, in combination with bending-levers, or a bending apparatus and a former, or their equivalents, acting in combination, substantially as specified hereinbefore.

2. A drop-hammer or its equivalent for the purpose set forth, in combination with the bending-levers, a former, and a suitable support for the chair-blank, or their equivalents, for the purposes set forth, and acting in combination substantially in the manner hereinbefore set forth.

3. The use of the discharging-lever K, or equivalent therefor, in combination with the former, for the purpose of forcing said former from the chair.

In testimony whereof I, GEORGE P. COX, administrator of the said SAMUEL A. COX deceased, have hereunto set my hand this the 12th day of March, 1862.

GEORGE P. COX,
*Administrator of Samuel A. Cox.*

Witnesses:
MUNROE STEVENS,
J. W. RICHARDSON.